United States Patent [19]
Winkler

[11] Patent Number: 4,653,612
[45] Date of Patent: Mar. 31, 1987

[54] SPEED LIMITER FOR LIFTS PROVIDED WITH CATCH DEVICE

[75] Inventor: Hugo Winkler, Vienna, Austria

[73] Assignee: Elevator GmbH, Baar, Switzerland

[21] Appl. No.: 682,217

[22] Filed: Dec. 17, 1984

[30] Foreign Application Priority Data

Dec. 16, 1983 [AT] Austria .................................. 4403/83

[51] Int. Cl.⁴ ............................................... B66B 1/00
[52] U.S. Cl. ........................................ 187/38; 188/189
[58] Field of Search ........................ 187/77, 78, 80, 89, 187/17, 38; 188/188, 189, 187

[56] References Cited

U.S. PATENT DOCUMENTS

| 1,156,324 | 10/1915 | Small et al. | 187/38 |
| 3,934,682 | 1/1976 | Hedstrom | 188/189 |
| 3,980,161 | 9/1976 | Mauldin | 188/188 |
| 4,095,681 | 6/1978 | David | 187/89 |

FOREIGN PATENT DOCUMENTS

| 121352 | 10/1978 | Japan | 187/38 |
| 404918 | 12/1965 | Switzerland | 187/38 |

Primary Examiner—Joseph J. Rolla
Assistant Examiner—Kenneth Noland
Attorney, Agent, or Firm—Browdy and Neimark

[57] ABSTRACT

The present invention concerns a speed limiter for lifts provided with catch device. The tension force acting on the lifting rope of an elevator is greatly variable. A detrimental feature herein is the jerky stopping of the rope sheave, resulting in looping of the rope and delay of the onset of braking effect. The invention serves the object to eliminate these drawbacks and to provide an improved speed limiter. This is accomplished, as taught by the invention, starting from a speed limiter for lifts provided with catch device in which on a stationary axle is rotatably carried a rope sheave that can be driven by a rope connected with the catch device in that on the axle is mounted a pre-set brake for a braking element, such as a disk or a drum, rotatable with reference to the axle against the braking effect, and that one the rope sheave is rotatably carried at least one eccentric cam turnable by a centrifugal weight against the force of a return spring, this cam coming into engagement with the rotatable braking element when a specified triggering speed of the rope sheave is exceeded.

6 Claims, 2 Drawing Figures

SPEED LIMITER FOR LIFTS PROVIDED WITH CATCH DEVICE

BACKGROUND OF THE INVENTION

The present invention concerns an improved speed limiter for lifts provided with catch device.

Passenger lifts and enterable goods lifts are provided with a catch device which by action of a speed limiter is triggered in the event that the normal travelling velocity is exceeded by a given value during downward travel of the cage. Triggering is effected by a rope driving the speed limiter, said rope being attached to the engaging lever of the catch device and running around the rope sheave of the speed limiter, being braked by the latter.

In speed limiters of prior art, in the event of transgression of the operating speed there is by means of rollers or of eccentrically carried cams created a force-induced connection between the driven rope sheave and a stationary cast bell so that triggering of the catch device is initiated by the tension force of the sliding rope over the wedge or seating groove of the rope sheave, now stationary. The tension force acting on the rope is greatly variable. A detrimental feature herein is the jerky stopping of the rope sheave, resulting in looping of the rope and delay of the onset of braking effect.

SUMMARY OF THE INVENTION

The invention serves the object to eliminate these drawbacks and to provide an improved speed limiter.

This is accomplished, as taught by the invention, starting from a speed limiter for lifts provided with catch device in which on a stationary axle is rotatably carried a rope sheave that can be driven by a rope connected with the catch device in that on the axle is mounted a pre-set brake for a braking element, such as a disk or a drum, rotatable with reference to the axle against the braking effect, and that on the rope sheave is rotatably carried at least one eccentric cam turnable by a centrifugal weight against the force of a return spring, this cam coming into engagement with the rotatable braking element when a specified triggering speed of the rope sheave is exceeded. Owing to this design, in the event of triggering speed transgression, the rope will from the very beginning be braked by the force of the pre-set brake, so that a uniform pulling force on the rope will trigger the catch device. The direct engagement of the eccentric cam with the brake causes not only the rope to be braked without delay, but also prevents uncontrolled build-up of the forces acting on the eccentric cam, respectively on the rope.

According to another characteristic feature of the invention, it is provided that on the rope sheave are rotatably carried, diametrally opposed, two eccentric cams linked with each other by centrifugal weights eccentrically pivoted on them, and that the eccentric cams turnable by the centrifugal weights can be brought into force-induced connection with a brake disk, which is with friction-induced force held fast between two disks mounted on the axle and urged against each other by pre-settable springs. Symmetric stressing of brake and rope sheave is guaranteed through this design. By carrying out the brake as a disk brake is enabled a compact and simple construction of the speed limiter. Alternatively, the brake may be carried out as a drum brake of which the drum is rotatable with reference to the axle, while the brake blocks are fixed on a stationary holder and are urged against the brake drum by the aid of pre-settable springs. The eccentric cams would in this case on transgression of the triggering velocity be in force-induced engagement with the brake drum and thus establish connection between brake and rope sheave.

Furthermore, according to the invention may be provided that the return springs coordinated with the centrifugal weights are disposed at the centre of gravity of the centrifugal weights and have been mounted in a spring holder which is freely movable relative to the axle. This affords the advantage that the spring holder equalizes any uneven tension of the return springs and unequal impact of the eccentric cams.

Furthermore, another characteristic feature of the invention consists of the circumstance that each centrifugal weight has a rectangular aperture, disposed at the centre of gravity, for receiving the return spring, that the spring holder has a projection extending into the rectangular aperture in the centrifugal weight, and that the return spring is carried out as a compression spring resting on one hand against the projection of the spring holder and on the other hand against an adjustment nut which has been provided on a spring bolt disposed in said rectangular aperture. In this design, the centrifugal forces are mainly taken up by the compression springs resting against the spring holder.

In order to interrupt the control current of the lift prior to reaching triggering speed, the invention provides that each centrifugal weight has at least one switching cam which on transgression of a given speed of rotation of the rope sheave which is lower than the triggering speed engages with a switch mounted on the stationary holder to the purpose of interrupting the lift's control current.

BRIEF DESCRIPTION OF THE DRAWINGS

In the following, the invention shall be more closely elucidated by an embodiment example with the aid of the drawings. In the drawings.

DETAILED DESCRIPTION OF A PREFERRED EMBODIMENT

Figure 1:
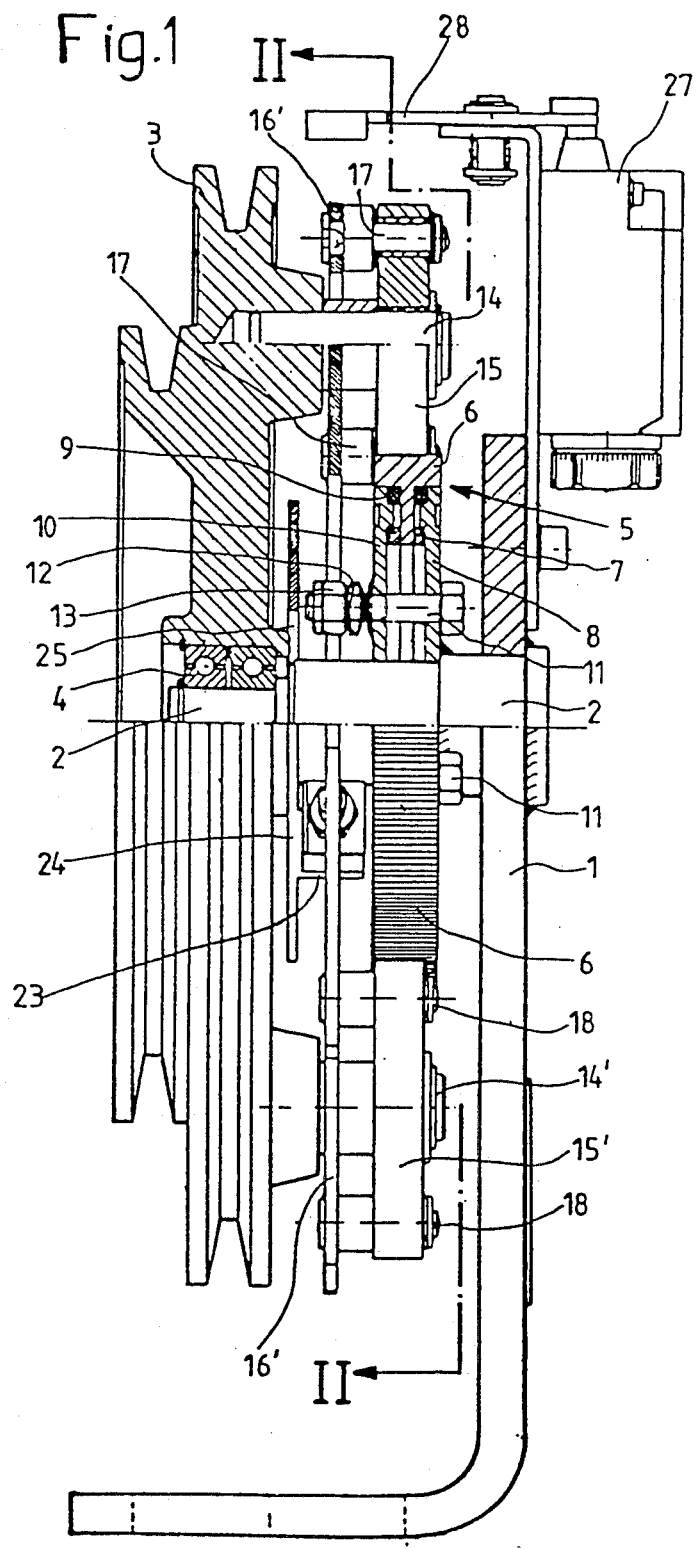
FIG. 1 presents a speed limiter according to the invention in elevational view, partly sectioned along the line I—I in FIG. 2.
Figure 2:
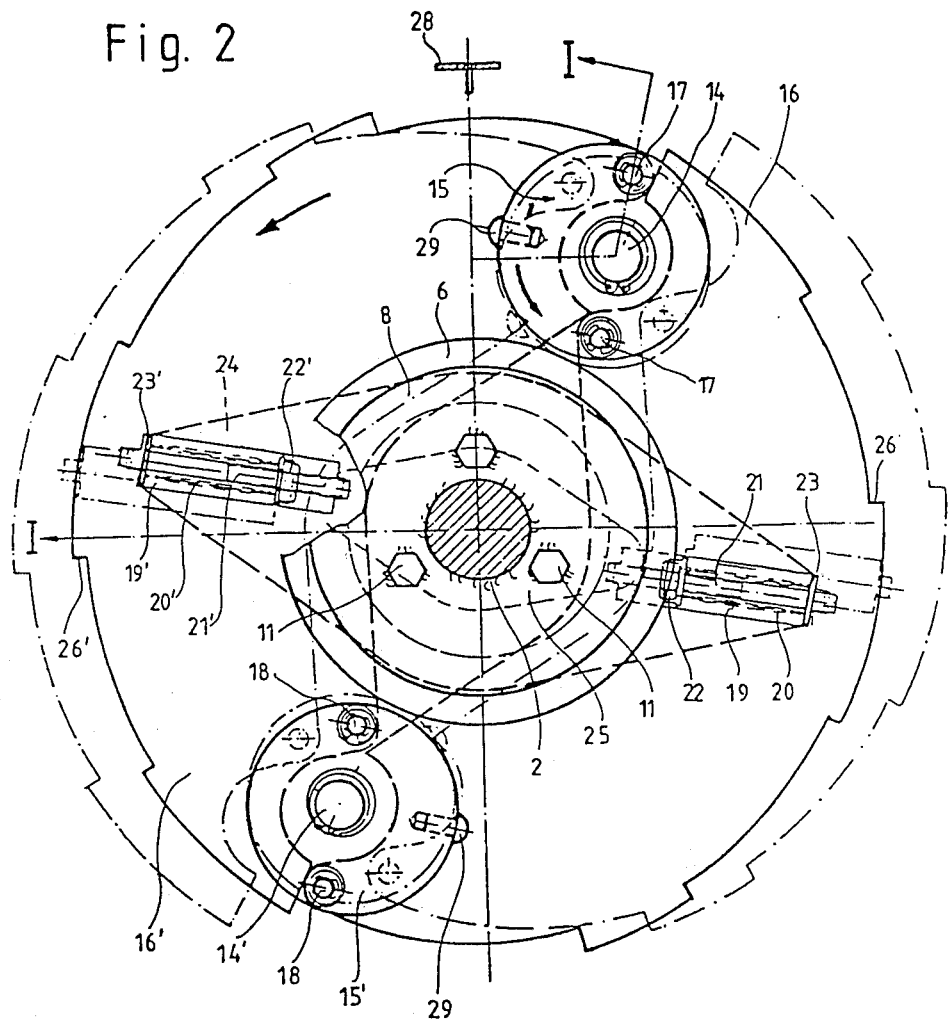
FIG. 2 presents a section along the line II—II in FIG. 1.

On a standard 1 has been fixed by welding an axle 2, on which a rope sheave 3 has been freely rotatably carried with ball bearings 4. Beside the rope sheave 3, a brake 5 has been mounted on the axle, this brake consisting of a brake disk 6 rotatable with reference to the axle 2, of a forward disk 8 welded to the axle 2 and abutting over brake linings 7 on said brake disk, and of a rear disk 10 likewise abutting over brake linings 9 on the brake disk 6. On the forward disk 8, holding bolts 11 have been fixed by welding, which in each instance pass through the forward disk 8 and the rear disk 10 and carry cup springs 12 abutting on the rear disk 10, these springs being pre-tensioned with the aid of an adjustment nut 13 screwed on the holding bolt 11. The adjustment nuts 13 are used to set the braking force exerted by the two disks 8 and 10 on the brake disk 6.

The brake disk 3 carries, on the side facing the brake 5, two diametrally opposed axle pins 14,14' on which two eccentric cams 15,15' disposed over the brake disk 6 have been rotatably carried, being interconnected by two sickle-shaped centrifugal weights 16,16'. Each centrifugal weight is, at one end, turnably carried on an eccentric pin 17 on one eccentric cam 15 and at the other end on an eccentric pin 18 on the other eccentric cam 15'. Each centrifugal weight 16,16' has in the region of its centre of gravity been provided with a rectangular aperture 19,19' in which has been disposed a spring bolt 21,21' carrying a return spring carried out as a compression spring. On the spring bolt 21,21' has been screwed an adjustment nut 22,22' secured by a lock washer to be unturnable and against which rests by one end the compression spring 20,20', while the other end of the compression spring 20,20' rests against the projection 23,23' of a spring holder 24, projecting into the rectangular aperture 19,19'. The spring holder 24 is held in position by the spring bolts 21,21' and the compression springs 20,20'. In its centre, the spring holder 24 has been provided with a recess 25 for the axle 2 to pass through, so that the spring holder 24 may revolve together with the centrifugal weights 16,16' without coming into contact with the axle 2.

On the outer side of the centrifugal weights 16,16' have been provided switching cams 26,26' interacting with a switch 27 mounted on the standard 1 and of which the switching arm 28 has been disposed above the path of the centrifugal weights 16,16'. This switch will interrupt the control current of the lift as soon as the centrifugal weights 16,16' by their eccentric cam turn the switching arm 28; at a given speed of rotation. This speed of rotation is lower than the triggering speed.

On transgression of the triggering speed, the centrifugal weights 16,16' turn the eccentric cams 15,15' far enough to bring their eccentric outer surface in contact with the outer side of the brake disk 6, whereupon the rope sheave 3 is braked by the brake 5 over the eccentric cams 15,15'. With the rope sheave 3, the driving rope is also braked and thereby will be triggered the catch device of the lift.

With a view to improving the engagement between the eccentric cams 15,15' and the brake disk 6, its outer side may be roughened, provided with a coating, or knurled. In order to limit the engagement range on the eccentric cams 15,15', a bolt 29 has been inserted in the outer side of the eccentric cams 15,15'.

I claim:

1. An improved speed limiter for lifts provided with a catch device, wherein on a stationary axle is rotatably carried a rope sheave that can be driven by a rope connected with the catch device, wherein the improvement comprises:

a pre-set brake for a brake element mounted on said axle for rotation with reference to the axle against the braking effect, the rope sheave rotatably carrying two diametrically opposed eccentric cams which are interconnected by centrifugal weights eccentrically pivoted thereto, said eccentric cams being turnable by movement of the centrifugal weights radially outwardly of said shaft, whereby said weights cause said cams to engage with a brake disk which is held fast through friction contact between two disks fixedly mounted on the axle and urged against each other by presettable springs, said eccentric cams being turnable against the force of a return spring which, when a given triggering speed of the rope sheave is attained, engages with the rotatable braking element.

2. The speed limiter according to claim 1, wherein said return spring coordinated with each centrifugal weight is disposed in the area of the centre of gravity of the centrifugal weights and is fixed in a spring holder freely movable with reference to the axle.

3. The speed limiter according to claim 2, wherein each centrifugal weight has a rectangular aperture, provided in the area of said centre of gravity, for housing the return spring, and a spring holder having a projection extending into the rectangular aperture in the centrifugal weight, said return spring comprising a compression spring which rests against a projection of the spring holder and also against an adjustment nut disposed on a spring bolt provided in said rectangular aperture.

4. The combination of a rotatable drive element for an elevator and apparatus for regulating the rotational speed of said drive element, the drive element being supported for rotation on, and about, a fixed shaft, comprising:

annular braking means including first and second spaced parallel portions fixedly mounted on said shaft and biased together to form a clamping means, and an annular third portion, supported for rotation about said shaft and said first and second portions, said third portion including a radially outer engagement surface and a radially inner part disposed between and fractionally engaging said clamping means formed by said first and second portions, at least two annular means, disposed radially outwardly of said annular third portion, for selectively engaging said third portion engagement surface, pin means fixedly secured to said drive element for each of said engaging means, each of said engaging means being eccentrically supported by said pin means, in spaced relation to said drive element, for rotation about said pin means, whereby each of said engaging means can be rotated into a position of engagement with said third portion engagement surface, and centrifugal means, connected to each of said engaging means and supported for movement radially outwardly relative to said shaft in response to the rotational speed of said drive element, for rotating said engaging means about said pin means into said position of engagement when said rotational speed of said drive element exceeds a predetermined value, whereby when said predetermined speed is attained, and said engaging means is rotated into said position of engagement, said drive element is effectively connected with said third portion, and the frictional engagement of said third portion with said clamping means causes reduction of rotation of said drive element.

5. The combination of clam 4, wherein each of said engaging means includes connection points located on diametrically opposite sides of said pin means, and said centrifugal means comprise at least two weights, each of said weights being connected to said engaging means at said connection points, whereby when said predetermined speed is attained, said weights are caused to be moved in diametrically opposite directions thereby effecting rotation of said engaging means about said pin means into said position of engagement with said third portion engagement surface.

6. The combination of claim 5, and further comprising means for supplying power to the elevator, and means for selectively interrupting the supply of power, said interrupting means being located proximal to the regulating apparatus, wherein
    said centrifugal means further comprises peripheral cam portions for engagement with said interrupting means to cut off the power to the elevator when a second predetermined rotational speed of said drive element, less than said first predetermined speed, is attained.

* * * * *